(12) United States Patent
Shigemitsu

(10) Patent No.: US 9,135,490 B1
(45) Date of Patent: Sep. 15, 2015

(54) COMMUNICATION SYSTEM, IMAGE PICKUP DEVICE, PROGRAM, AND COMMUNICATION METHOD

(71) Applicant: SEIKO EPSON CORPORATION, Tokyo (JP)

(72) Inventor: Makoto Shigemitsu, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/582,722

(22) Filed: Dec. 24, 2014

(30) Foreign Application Priority Data

Mar. 4, 2014 (JP) .................. 2014-041991

(51) Int. Cl.
G06K 7/10 (2006.01)
G06K 7/14 (2006.01)
G06K 19/06 (2006.01)

(52) U.S. Cl.
CPC ............ G06K 7/1417 (2013.01); G06K 7/1447 (2013.01); G06K 19/06037 (2013.01); G06K 19/06112 (2013.01)

(58) Field of Classification Search
USPC .............. 235/462.11, 462.09, 462.25, 472.01
See application file for complete search history.

(56) References Cited

U.S. PATENT DOCUMENTS

| | | | |
|---|---|---|---|
| 7,090,136 B2 * | 8/2006 | Muramatsu | 235/462.25 |
| 8,279,258 B2 | 10/2012 | Ichieda | |
| 2014/0097251 A1 * | 4/2014 | Joussen et al. | 235/462.07 |
| 2014/0098220 A1 * | 4/2014 | Nunnink et al. | 348/135 |
| 2014/0217264 A1 * | 8/2014 | Shepard et al. | 250/208.1 |
| 2015/0050027 A1 * | 2/2015 | Oshima et al. | 398/130 |

FOREIGN PATENT DOCUMENTS

JP        A-2008-077380        4/2008

* cited by examiner

*Primary Examiner* — Allyson Trail
(74) *Attorney, Agent, or Firm* — Oliff PLC (57) ABSTRACT

A projector includes: a storage unit which stores data; a dividing unit which divides the data; an encoding unit which encodes each of the divided data and order information indicating an order of the data and thus generates a plurality of code images; and a projection unit which displays the plurality of code images at a first frame rate. A tablet terminal includes: an image pickup unit which sequentially picks up images of the plurality of code images displayed by the projection unit, at a second frame rate that is higher than the first frame rate; a decoding unit which extracts and decodes the code images from pickup images; and a combining unit which combines the data decoded by the decoding unit.

8 Claims, 7 Drawing Sheets

COMMUNICATION SYSTEM, IMAGE PICKUP DEVICE, PROGRAM, AND COMMUNICATION METHOD

CROSS-REFERENCE TO RELATED APPLICATION

The entire disclosure of Japanese Patent Application No. 2014-041991, filed Mar. 4, 2014 is expressly incorporated by reference herein.

BACKGROUND

1. Technical Field

The present invention relates to a communication system, an image pickup device, a program, and a communication method.

2. Related Art

A communication system in which a QR code (trademark registered) displayed on a display unit of an electronic device is picked up as an image and read by another electronic device is known. JP-A-2008-077380 discloses the use of a three-dimensional code formed by changing a two-dimensional code in time series, for wireless LAN (local area network) connection between a projector and an information terminal.

In the traditional communication via a two-dimensional code, there is an upper limit to the volume of data that can be communicated. Also, JP-A-2008-077380 does not describe the relation between the frame rate at which the projector projects a three-dimensional code and the frame rate at which the information terminal picks up an image of the three-dimensional code, and therefore data cannot be communicated via a three-dimensional code.

SUMMARY

An advantage of some aspects of the invention is that a greater volume of data can be communicated via a code image.

An aspect of the invention provides a communication system including a display device and an image pickup device. The display device includes: a storage unit which stores data; a dividing unit which divides the data; an encoding unit which encodes each of the data divided by the dividing unit and order information indicating an order of the data and thus generates a plurality of code images; and a display unit which displays the plurality of code images generated by the encoding unit, at a first frame rate according to the order. The image pickup device includes: an image pickup unit which sequentially picks up images of the plurality of code images displayed by the display unit, at a second frame rate that is higher than the first frame rate; a decoding unit which extracts and decodes the code images from pickup images picked up by the image pickup unit; and a combining unit which combines the data decoded by the decoding unit according to the order indicated by the order information. According to this communication system, a greater volume of data can be communicated via the code images, compared with the case where a single code image is displayed.

In a preferred aspect, the display unit repeatedly displays the plurality of code images, and the image pickup unit continues image pickup until images of all the plurality of code images are picked up. According to this communication system, a loss of the plurality of code images at the time of image pickup is prevented.

In another preferred aspect, the display unit displays information indicating a timing when a first code image of the plurality of code images is displayed. According to this communication system, the image pickup device can specify the timing when the first code image of the plurality of code images is displayed.

In another preferred aspect, the display device includes a sound emitting unit which emits a sound indicating a timing when a first code image of the plurality of code images is displayed. According to this communication system, the image pickup device can specify the timing when the first code image of the plurality of code images is displayed.

In another preferred aspect, the display unit displays an order image indicating the order beside at least one code image of the plurality of code images. The image pickup device include a determination unit which determines whether images of all the plurality of code images are picked up or not, on the basis of the order image extracted from the pickup image. The image pickup unit continue image pickup until the determination unit determines that images of all the plurality of code images are picked up. According to this communication system, the image pickup device can determine whether images of all the code images are picked up or not, without decoding the code images.

In another preferred aspect, if the decoding unit is successful in decoding a certain pickup image, the decoding unit decodes, next to the decoding, a pickup image that is two frames or more after the pickup image. According to this communication system, the time required for decoding is shortened, compared with the case where all the plurality of code images is decoded.

Another aspect of the invention provides an image pickup device including: an image pickup unit which sequentially picks up images of a plurality of code images sequentially displayed at a first frame rate and representing data and order information indicating an order of the data, at a second frame rate that is higher than the first frame rate; a decoding unit which extracts and decodes the code images from pickup images picked up by the image pickup unit; and a combining unit which combines the data decoded by the decoding unit according to the order indicated by the order information. According to this image pickup device, a greater volume of data can be communicated via the code images, compared with the case where an image of a single code image is picked up.

Still another aspect of the invention provides a program for executing: sequentially picking up images of a plurality of code images that is sequentially displayed at a first frame rate and represent data and order information indicating an order of the data, at a second frame rate that is higher than the first frame rate; extracting and decoding the code images from the pickup images that are picked up; and combining the decoded data according to the order indicated by the order information. According to this program, a greater volume of data can be communicated via the code images, compared with the case where an image of a single code image is picked up.

Yet another aspect of the invention provides a communication method including: dividing data; encoding each of the divided data and order information indicating an order of the data and thus generating a plurality of code images; displaying the plurality of code images at a first frame rate according to the order; sequentially picks up images of the plurality of code images that is displayed, at a second frame rate that is higher than the first frame rate; extracting and decoding the code images from the pickup images that are picked up; and combining the decoded data according to the order indicated by the order information. According to this communication method, a greater volume of data can be communicated via the code images, compared with the case where a single code image is displayed.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Configuration

Figure 1:
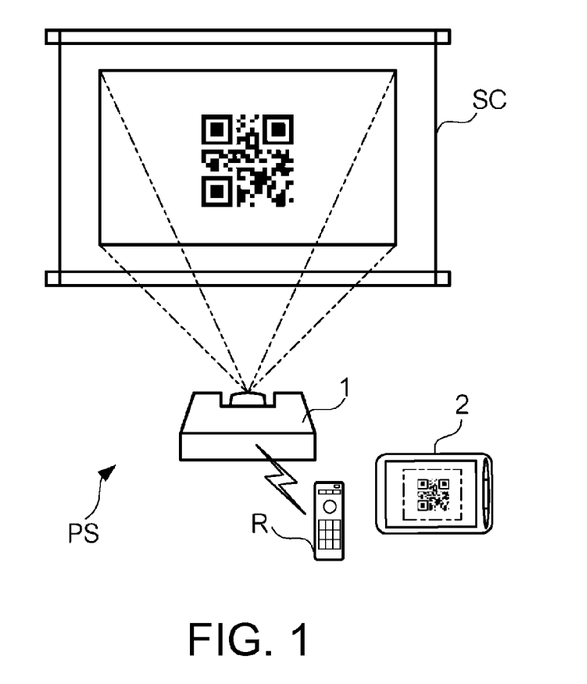
FIG. 1 shows the overall configuration of a projection system.

FIG. 1 shows the overall configuration of a projection system PS according to an embodiment of the invention. The projection system PS includes a projector 1, a tablet terminal 2, a controller R, and a screen SC. The projection system PS is a system for transmitting data from the projector 1 to the tablet terminal 2 via a two-dimensional code. The projector 1 is a display device which encodes data, thus generates a two-dimensional code, and projects the two-dimensional code. In the example of FIG. 1, the projector 1 projects a QR code (an example of a code image) on the screen SC. The tablet terminal 2 is an image pickup device which picks up an image of the QR code projected on the screen SC and decodes the QR code. The controller R is a device for controlling the projector 1 wirelessly via infrared communication or the like, that is, a so-called remote controller. The screen SC is a surface on which an image projected by the projector 1 (hereinafter referred to as "projected image") is shown.

In communication via a two-dimensional code, there is an upper limit to the volume of data that can be transmitted via a single two-dimensional code. For example, as for QR codes, a plurality of versions (versions 1 to 40) according to the number of cells in the codes are prescribed, and the maximum volume of data that can be transmitted via a QR code of version 40 is about 3 kilobytes (2953 bytes, to be more precise) per QR code. Therefore, data exceeding the maximum volume cannot be transmitted via a single two-dimensional code. In the projection system PS, as the projector 1 sequentially projects a plurality of QR codes and the tablet terminal 2 reads (picks up images of and decodes) the plurality of QR codes, data exceeding the maximum volume is communicated.

Figure 2:
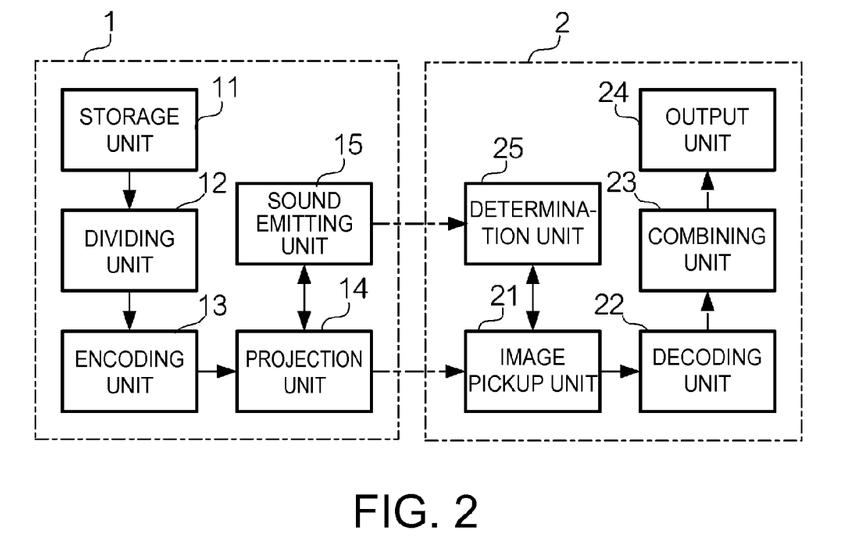
FIG. 2 is a block diagram showing the functional configuration of the projection system.

FIG. 2 is a block diagram showing the functional configuration of the projection system PS. The projector 1 includes a storage unit 11, a dividing unit 12, an encoding unit 13, a projection unit 14, and a sound emitting unit 15. The storage unit 11 stores data that is a target of communication (hereinafter referred to as "target data"). The dividing unit 12 divides the target data into a predetermined size. The encoding unit 13 encodes each of the data divided by the dividing unit 12 (hereinafter referred to as "divided data") and information indicating an order of the divided data (hereinafter referred to as "order information") and thus generates a plurality of QR codes. The projection unit 14 (an example of a display unit) projects the plurality of QR codes generated by the encoding unit 13, at a predetermined interval according to the order of the divided data. Hereinafter, the frame rate at which the projection unit 14 sequentially projects the plurality of QR codes is referred to as "frame rate F1". The sound emitting unit 15 emits a sound indicating the timing when the first QR code of the plurality of QR codes is projected.

The tablet terminal 2 includes an image pickup unit 21, a decoding unit 22, a combining unit 23, an output unit 24, and a determination unit 25. The image pickup unit 21 sequentially picks up images of the plurality of QR codes projected by the projection unit 14, at a predetermined interval. Hereinafter, the frame rate at which the image pickup unit 21 sequentially picks up images of the plurality of QR codes is referred to as "frame rate F2". The frame rate F2 is a higher rate than the frame rate F1. The decoding unit 22 extracts and decodes the QR codes from the images picked up by the image pickup unit 21 (hereinafter referred to as "pickup images"). The combining unit 23 combined the divided data decoded by the decoding unit 22. The combining unit 23 combines the divided data according to the order indicated by the order information. The output unit 24 outputs the data combined by the combining unit (that is, target data). The determination unit 25 determines whether images of all the plurality of QR code are picked up or not.

Figure 3:
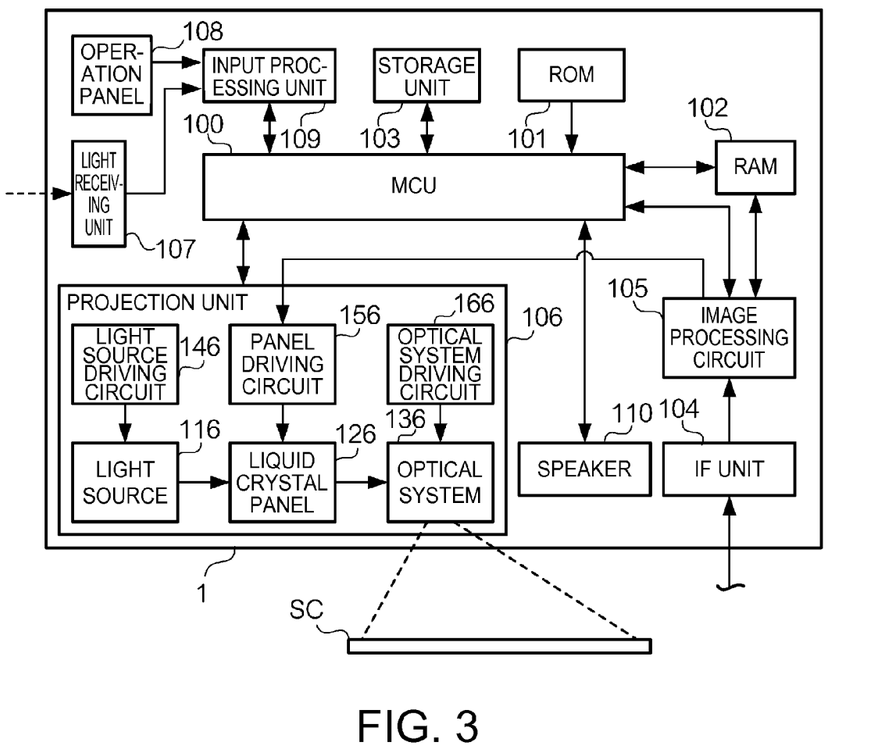
FIG. 3 is a block diagram showing the hardware configuration of a projector.

FIG. 3 is a block diagram showing the hardware configuration of the projector 1. The projector 1 includes an MCU (micro control unit) 100, a ROM (read only memory) 101, a RAM (random access memory) 102, a storage unit 103, an IF (interface) unit 104, an image processing circuit 105, a projection unit 106, a light receiving unit 107, an operation panel 108, an input processing unit 109, and a speaker 110. The MCU 100 is a control unit which executes a program and thus controls each part of the projector 1. The ROM 101 is a non-volatile storage device in which various programs and data are stored. The ROM 101 stores programs that are executed by the MCU 100. The RAM 102 is a volatile storage device which stores data. The RAM 102 has a frame memory which stores images on a frame basis. The storage unit 103 is a storage device which stores data and programs.

The IF unit 104 communicates with an electronic device or the like that is a video source. The IF unit 104 has various terminals (for example, VGA terminal, USB terminal, wired LAN interface, S terminal, RCA terminal, HDMI (High-Definition Multimedia Interface (trademark registered) terminal and the like) and a wireless LAN interface, to connect to an external device. The image processing circuit 105 performs predetermined image processing on an image represented by a video signal inputted from the electronic device as a video source (hereinafter referred to as "input image"). The image processing circuit 105 writes the image-processed input image to the frame memory.

The projection unit 106 has a light source 116, a liquid crystal panel 126, an optical system 136, a light source driving circuit 146, a panel driving circuit 156, and an optical system driving circuit 166. The light source 116 has a lamp such as a high-pressure mercury lamp, halogen lamp or metal halide lamp, or a solid light source such as an LED (light emitting diode) or laser diode, and casts light on the liquid crystal panel 126. The light crystal panel 126 is a light modulator which modulates the light cast from the light source 116, according to image data. In this example, the liquid crystal panel 126 is a transmission-type liquid crystal panel, in which the transmittance of each pixel is controlled according to image data. The projector 1 has three liquid crystal panels 126 corresponding to the primary colors of RGB. The light from the light source 116 is separated into three color lights of RGB and each color light becomes incident on the corresponding liquid crystal panel 126. The color lights transmitted through and modulated by the respective liquid crystal panels are combined by a cross dichroic prism or the like and then emitted to the optical system 136. The optical system 136 has a lens which enlarged and projects the light modulated to image light by the liquid crystal panels 126, onto the screen SC, and a zoom lens which carries out enlargement and reduction of the image to be projected, and adjustment of the focal point. The light source driving circuit 146 drives the light source 116 under the control of the MCU 100. The panel driving circuit 156 drives the liquid crystal panels 126 according to the image data outputted from the image processing circuit 105. The optical system driving circuit 166 drives the optical system 136 under the control of the MCU 100 and carries out adjustment of the degree of zooming and adjustment of focusing.

The light receiving unit 107 receives an infrared signal transmitted from the controller R, decodes the received infrared signal, and outputs the decoded signal to the input processing unit 109. The operation panel 108 has buttons and switches to turn on/off the power of the projector 1 and to carry out various operations. The input processing unit 109 generates information indicating the content of an operation by the controller R and the operation panel 108, and outputs the information to the MCU 100. The speaker 110 outputs a sound according to an electrical signal outputted from the MCU 100.

In the projector 1, the MCU 100 executing a program is an example of the dividing unit 12 and the encoding unit 13. The projection unit 106 controlled by the MCU 100 executing a program is an example of the projection unit 14. The speaker 110 controlled by the MCU 100 executing a program is an example of the sound emitting unit 15. The storage unit 103 is an example of the storage unit 11.

Figure 4:
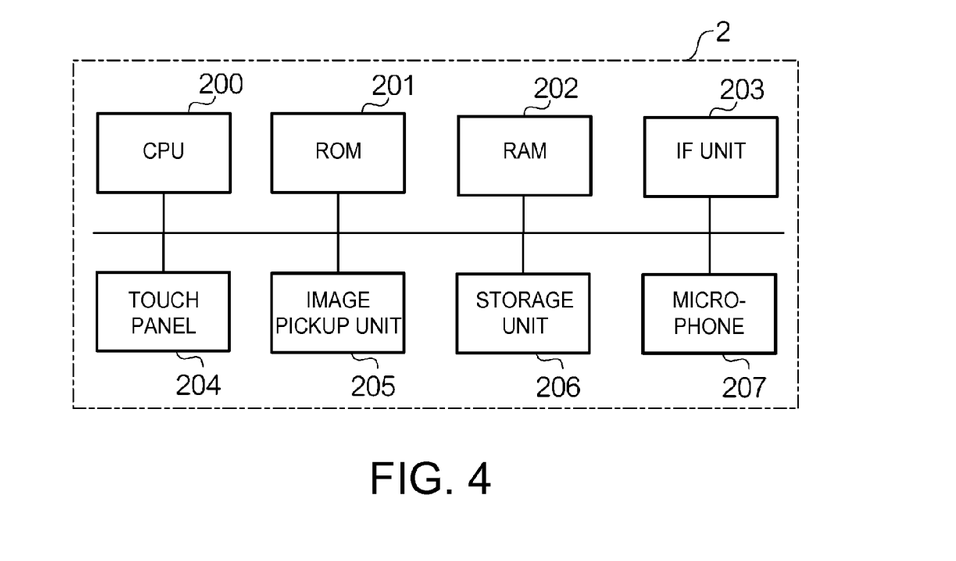
FIG. 4 is a block diagram showing the hardware configuration of a tablet terminal.

FIG. 4 is a block diagram showing the hardware configuration of the tablet terminal 2. The tablet terminal 2 includes a CPU (central processing unit) 200, a ROM 201, a RAM 202, an IF unit 203, a touch panel 204, an image pickup unit 205, a storage unit 206, and a microphone 207. The CPU 200 is a control device which executes a program and thus controls each part of the tablet terminal 2. The ROM 201 is a non-volatile storage device in which various programs and data are stored. The RAM 202 is a volatile storage device which stores data. The IF unit 203 has various terminals and a wireless LAN interface to communicate with an external device. The touch panel 204 is an input device in which a panel that detects coordinates is superimposed on a display surface of a liquid crystal display or the like. As the touch panel 204, for example, an optical-type, resistive membrane-type, electrostatic capacitance-type, or ultrasonic-type touch panel is used. The image pickup unit 205 is a digital camera which picks up an image of a subject and generates image data, and includes a lens, a CCD (charge coupled device) image sensor, and a signal processing circuit (these components are not shown). The storage unit 206 is a storage device which stores data and programs. The microphone 207 converts a sound to an electrical signal and outputs the electrical signal to the CPU 200.

In the tablet terminal 2, the image pickup unit 205 controlled by the CPU 200 executing a program is an example of the image pickup unit 21. The CPU 200 executing a program is an example of the decoding unit 22, the combining unit 23 and the determination unit 25. The touch panel 204 controlled by the CPU 200 executing a program is an example of the output unit 24.

2. Operations

Figure 5:
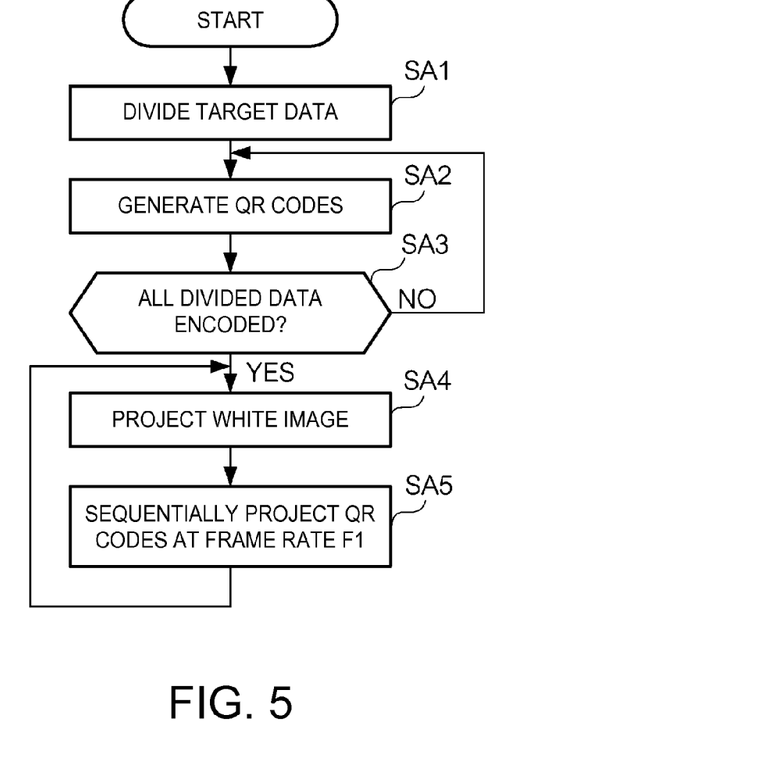
FIG. 5 is a flowchart showing processing to project a QR code.

FIG. 5 is a flowchart showing processing in which the projector 1 sequentially projects a plurality of QR codes. In this example, target data is dynamic image data that represents a dynamic image. The dynamic image data is stored in the storage unit 103 in advance. The following processing is started, triggered by the fact that an instruction to project the QR codes (hereinafter referred to as "QR code projection instruction") is inputted to the projector 1. The QR code projection instruction is inputted, for example, by the user operating the controller R or the operation panel 108.

In Step SA1, the MCU 100 divides the target data. Specifically, the MCU 100 reads out the target data from the storage unit 103 and divides the target data. The size of the divided data is predetermined according to the version of the QR code to be generated, in such a way as to be a size equal to or below a maximum volume of data that can be transmitted via a single QR code. The MCU 100 stores a plurality of divided data in the RAM 102. The MCU 100 also adds order information to each of the divided data stored in the RAM 102. In this example, the MCU 100 adds numbers (hereinafter referred to as "frame numbers") as order information. The MCU 100 adds frames numbers in ascending order from the divided data corresponding to the leading edge of the target data. As the MCU 100 finishes dividing all the target data, the MCU 100 stores the total number of divided data (hereinafter referred to as "total number of frames") in the RAM 102.

In Step SA2, the MCU 100 encodes each of the divided data and thus generates a plurality of QR codes. Specifically, the MCU 100 reads out the divided data, the frame numbers added to the divided data and the total number of frames from the RAM 102 and also reads out information indicating the frame rate F1 from the ROM 101, and then encodes these pieces of information and thus generates QR codes of a predetermined version. The MCU 100 encodes the divided data, for example, in order from the smallest frame number and thus generates QR codes, and stores the QR codes in the RAM 102. The MCU 100 separately adds a frame number that is the same as the frame number indicated by each QR code, to each of the QR codes stored in the RAM 102.

Figure 6:
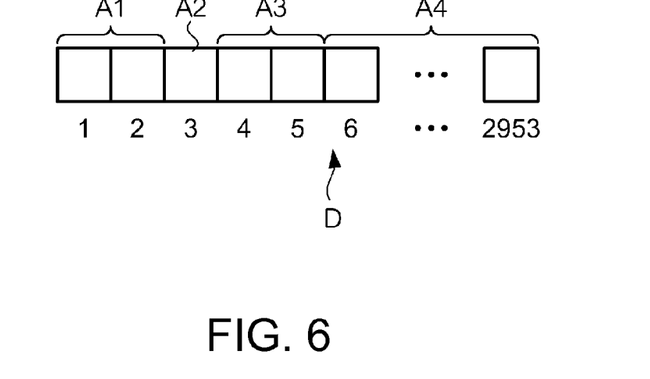
FIG. 6 illustrates the data format of a QR code.

FIG. 6 illustrates the data format of a QR code generated by the projector 1. FIG. 6 shows an example in which a QR code D of version 40 (2953 bytes) is generated by the projector 1. The QR code D includes a 2-byte area A1 indicating the frame number, a 1-byte area A2 indicating the frame rate F1, a 2-byte area A3 indicating the total number of frames, and a 2948-byte area A4 representing the divided data. Each area of the QR code D includes information that enables the device on the reading side to restore the encoded information even if a part of the QR code cannot be read because of a loss.

Back to FIG. 5, in Step SA3, the MCU 100 determines whether all the divided data are encoded or not. Whether all the divided data are encoded or not is determined on the basis of whether divided data that is not encoded is stored in the RAM 102 or not. If it is determined that all the divided data are encoded (SA3: YES), the MCU 100 shifts the processing to Step SA4. If it is determined that there is divided data that is not encoded (SA3: NO), the MCU 100 shifts the processing to Step SA2 and continues to generate QR codes.

In Step SA4, the MCU 100 projects an image showing the beginning of the series of QR codes, for example, an entirely white image (hereinafter referred to as "white image"). The white image is displayed in order to allow the tablet terminal 2 to specify the timing when the first QR code of the plurality of QR codes is projected. Specifically, the MCU 100 reads out a white image from the ROM 101 and projects the white image on the screen SC for a predetermined time. In Step SA5, the MCU 100 sequentially projects the plurality of QR codes at the frame rate F1. Specifically, the MCU 100 reads out the plurality of QR codes in order from the QR code with the smallest frame number and sequentially projects the QR codes. The MCU 100 projects the plurality of QR codes, for example, at 20 FPS (frames per second). As the MCU 100 finishes projecting all the QR codes, the MCU 100 shifts the processing to Step SA4 and repeats the projection of a white image and the projection of QR codes.

Figure 7:
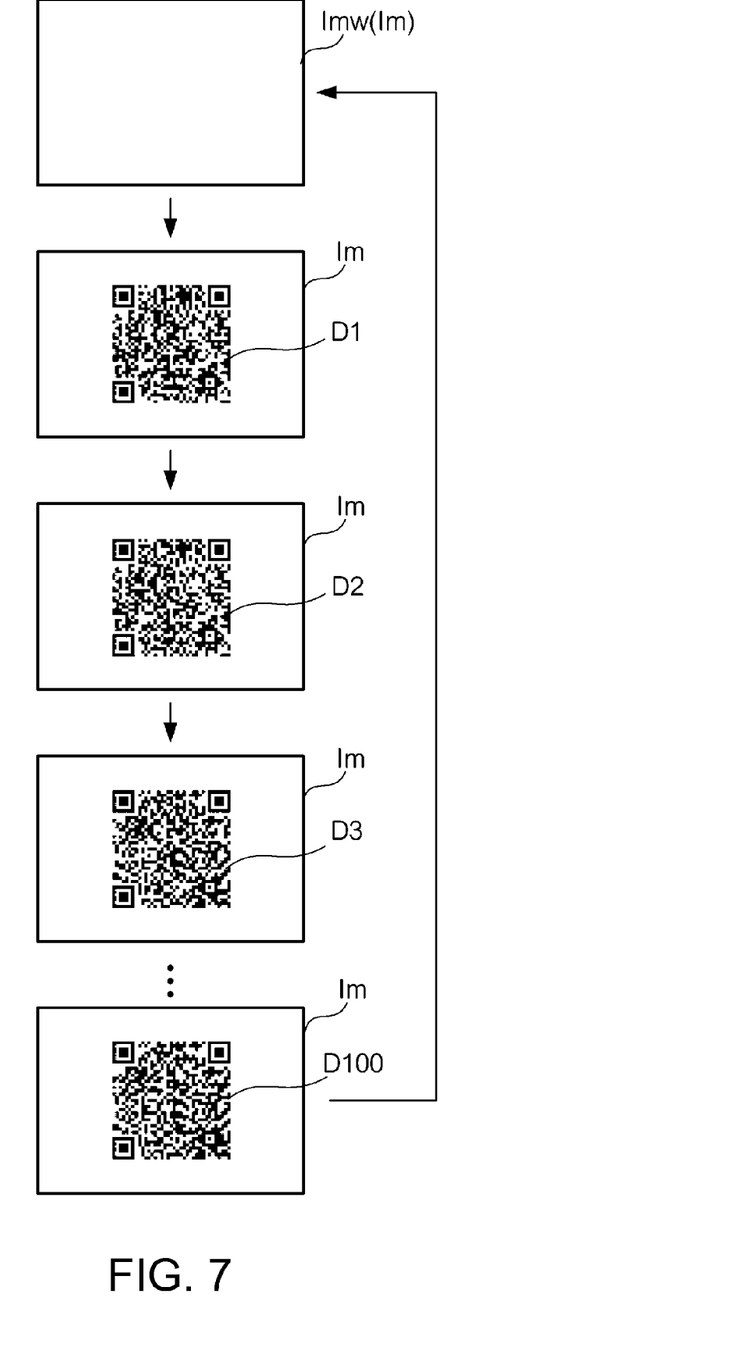
FIG. 7 illustrates transition of a projected image.

FIG. 7 illustrates transition of a projected image Im in the case where the processing shown in FIG. 5 is carried out. In FIG. 7, a projected image Imw represents a white image. QR codes D1, D2, D3, and D100 represent the QR codes of the first frame, second frame, third frame, and 100$^{th}$ frame, respectively. In FIG. 7, for convenience of explanation, the version of each QR code D is version 5, and character data is encoded in each QR code D. In the example of FIG. 7, the projector 1 projects each QR code D at 20 FPS for five seconds (100 frames). For example, if the version of each QR code D is version 40, the QR codes corresponding to 100 frames represent data of 295.3 kilobytes. After the projector 1 projects the QR codes to the QR code D100, the projector 1 projects the projected image Imw again.

Figure 8:
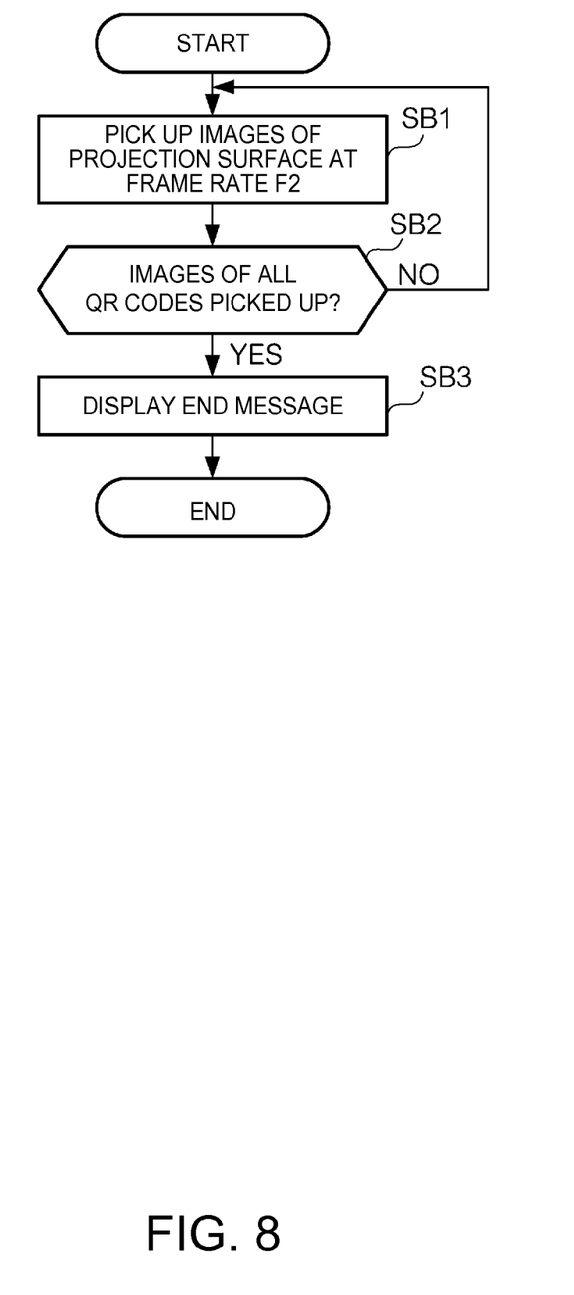
FIG. 8 is a flowchart showing processing to pick up an image of a QR code.

FIG. 8 is a flowchart showing processing in which the tablet terminal 2 sequentially picks up images of a plurality of QR codes. The following processing is started as the user operates the touch panel 204 to start up a program for reading the plurality of QR codes in the state where the plurality of QR codes is sequentially projected on the screen SC. The user holds the tablet terminal 2 in such a way that images of the QR codes projected on the screen SC are picked up by the image pickup unit 205.

In Step SB1, the CPU 200 sequentially picks up images of the plurality of QR codes projected on the screen, at the frame rate F2. As described above, the frame rate F2 is a higher frame rate than the frame rate F1. In order to pick up images of all the plurality of QR codes that is projected, it is desirable that the frame rate F2 is twice the frame rate F1 or higher. The CPU 200 picks up images of the QR codes, for example, at 60 FPS. The CPU 200 stores image data representing the pickup images, in the RAM 202.

In Step SB2, the CPU 200 determines whether images of all the plurality of QR codes are picked up or not. Specifically, the CPU 200 analyzes the histogram of gradation levels of the pickup images and thus specifies the number of times a white image is projected while the image pickup is carried out (that is, the number of times the processing of Step SA4 is carried out). If the number of times a white image is projected is specified as twice or more, the CPU 200 determines that images of all the plurality of QR codes are picked up. If it is determined that images of all the plurality of QR codes are picked up (SB2: YES), the CPU 200 shifts the processing to Step SB3. If it is determined that there is a QR code whose image is not picked up (SB2: NO), the CPU 200 shifts the processing to SB1 and continues to pick up images of the QR codes.

In Step SB3, the CPU 200 displays a message indicating that the image pickup of the QR codes is ended (hereinafter referred to as "end message") on the touch panel 204. The end message is stored in the storage unit 206. The end message includes, for example, a message such as "Image pickup of all the QR codes is complete".

Figure 9:
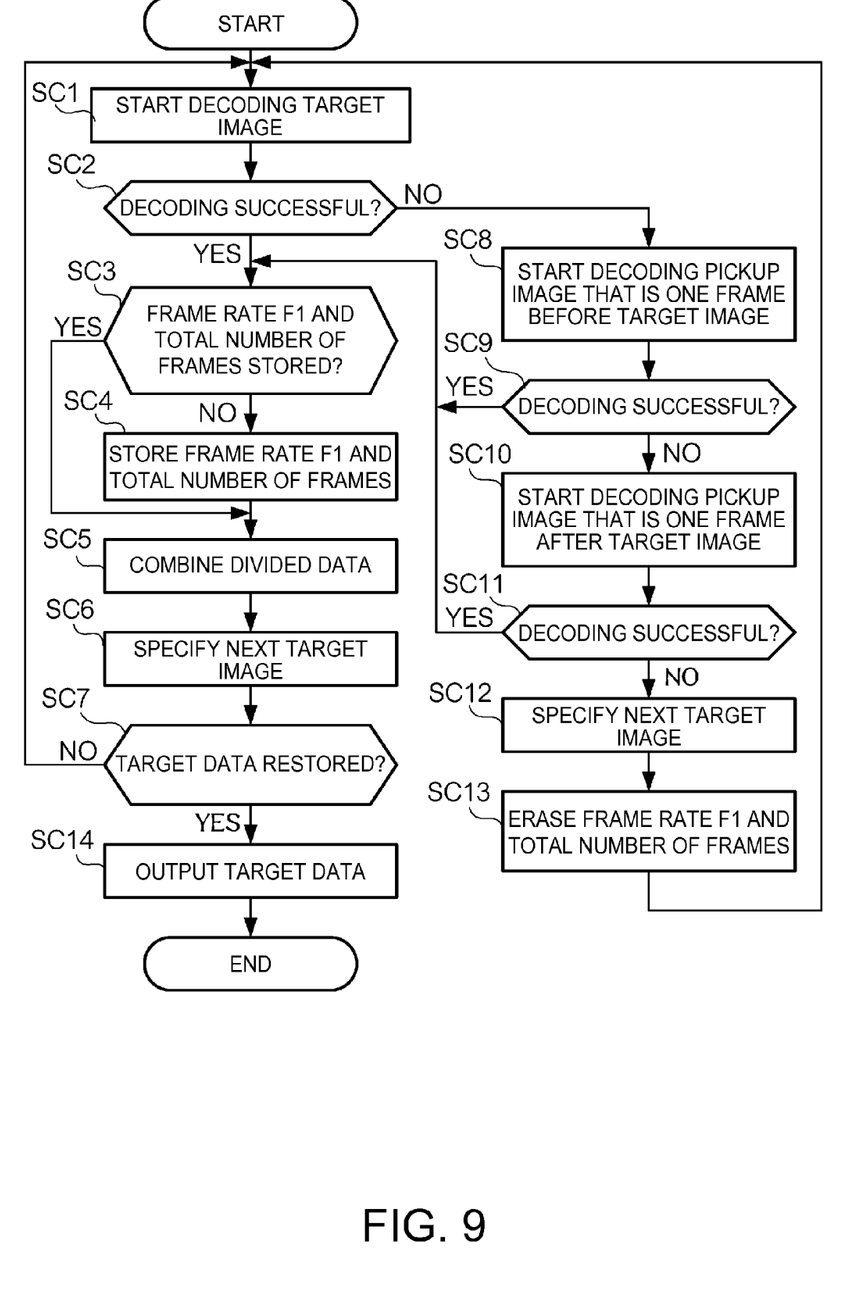
FIG. 9 is a flowchart showing processing to decode a QR code.

FIG. 9 is a flowchart showing processing in which the tablet terminal 2 decodes a plurality of QR codes. The following processing is started, for example, triggered by the fact that the processing shown in FIG. 8 is ended.

In Step SC1, the CPU 200 extracts a QR code from an image that is a decoding target (hereinafter referred to as "target image") of a plurality of pickup images, and starts decoding the QR code. The target image is specified by the processing of step SC6 or step SC12, described below. When the processing of Step SC1 is carried out first, the CPU 200 specifies a pickup image in which the QR code of the first frame is picked up, as the first target image. The CPU 200 specifies the pickup image in which the QR code of the first frame is picked up, on the basis of the timing when a white image is picked up. Specifically, the CPU 200 analyzes the histogram of gradation levels of pickup images and thereby specifies a pickup image in which a white image is picked up first, and specifies a pickup image that is picked up a predetermined number of frames after the pickup image, as a pickup image in which the QR code of the first frame is picked up.

In Step SC2, the CPU 200 determines whether the decoding of the QR code is successful or not. Specifically, if decoded information (that is, the frame number, the frame rate F1, the total number of frames, and the divided data) is obtained within a predetermined time following the start of the decoding, the CPU 200 determines that the decoding of the QR code is successful. If decoded information is not obtained within the predetermined time, or if an error occurs during the decoding, the CPU 200 determines that the decoding of the QR code is not successful. If the decoding of the QR code is determined as successful (SC2: YES), the CPU 200 stores the divided data in the RAM 202 and shifts the processing to Step SC3. If the decoding of the QR code is determined as not successful (SC2: NO), the CPU 200 shifts the processing to Step SC8.

In Step SC3, the CPU 200 determines whether the frame rate F1 and the total number of frames are stored in the RAM 202 or not. Initially, when the processing of FIG. 9 is started, the frame rate F1 and the total number of frames are not stored in the RAM 202. If it is determined that the frame rate F1 and the total number of frames are not stored in the RAM 202 (SC3: NO), the CPU 200 shifts the processing to Step SC4. If it is determined that the frame rate F1 and the total number of frames are stored in the RAM 202 (SC3: YES), the CPU 200 shifts the processing to Step SC5.

In Step SC4, the CPU 200 stores the frame rate F1 and the total number of frames included in the decoded information, in the RAM 202. In Step SC5, the CPU 200 combines the newly decoded divided data with the previously decoded divided data. Specifically, the CPU 200 combines the divided data according to the frame number included in the decoded information. In Step SC6, the CPU 200 specifies the next target image. Specifically, the CPU 200 specifies a pickup image that is after the current target image by the number of frames equal to the frame rate F2 divided by the frame rate F1, as the next target image. For example, if the frame rate F1 is 20 FPS and the frame rate F2 is 60 FPS, the CPU 200 specifies a pickup image that is three frames after the current target image, as the next target image. As described above, it is desirable that the frame rate F2 is twice the frame rate F1 or higher. Therefore, in Step SC6, the CPU 200 specifies a pickup image that is two frames or more after the current target image, as the next target image.

In Step SC7, the CPU 200 determines whether target data is restored or not. Specifically, the CPU 200 determines whether target data is restored or not, on the basis of whether the frame number included in the information that is decoded last coincides with the total number of frames stored in the RAM 202 or not. If it is determined that target data is restored (SC7: YES), the CPU 200 shifts the processing to Step SC14. If it is determined that target data is not restored (SC7: NO), the CPU 200 shifts the processing to Step SC1.

In Step SC8, the CPU 200 extracts a QR code from a pickup image that is picked up one frame before the target image (hereinafter referred to as "pickup image Ib") and starts decoding the QR code. As a cause of the unsuccessful decoding of the QR code in Step SC2, it can be considered that there is a problem in the pickup image, such as in the case where the QR code is out of focus or in the case where there is a stain on the screen SC. Thus, the CPU 200 decodes the QR code included in a different frame from the target image. In Step SC9, the CPU 200 determines whether the decoding of the QR code included in the pickup image Ib is successful or not. The CPU 200 determines whether the decoding of the QR code is successful or not, by the similar method to Step SC2. If the decoding of the QR code is determined as successful (SC9: YES), the CPU 200 stores the divided data in the RAM 202 and shifts the processing to Step SC3. If the decoding of the QR code is determined as not successful (SC9: NO), the CPU 200 shifts the processing to Step SC10.

In Step SC10, the CPU 200 extracts a QR code from a pickup image that is picked up one frame after the target image (hereinafter referred to as "pickup image Ia") and starts decoding the QR code. The CPU 200 decodes the QR code included in a different frame from the target image for the similar reason to Step SC8. In Step SC11, the CPU 200 determines whether the decoding of the QR code included in the pickup image Ia is successful or not. The CPU 200 determines whether the decoding of the QR code is successful or not, by the similar method to Step SC2. If the decoding of the QR code is determined as successful (SC11: YES), the CPU 200 stores the divided data in the RAM 202 and shifts the processing to Step SC3. If the decoding of the QR code is determined as not successful (SC11: NO), the CPU 200 shifts the processing to Step SC12.

In Step SC12, the CPU 200 specifies the next target image. Specifically, the CPU 200 specifies a pickup image that is a predetermined number of frames (for example, several frames) before the current target image, as the next target image. The CPU 200 may also specify a pickup image that is a predetermined number of frames after the current target image, as the next target image. In Step SC13, the CPU 200 erases the frame rate F1 and the total number of frames stored in the RAM 202. As the CPU 200 finishes the processing of Step SC13, the CPU 200 shifts the processing to Step SC1.

In Step SC14, the CPU 200 outputs the restored target data. Specifically, the CPU 200 displays the target data on the touch panel 204.

By the above processing, data is communicated between the projector 1 and the tablet terminal 2 via a plurality of QR codes that is sequentially projected. Therefore, data can be communicated via QR codes without being restricted by the maximum volume of the QR codes. Also, since only a part of a plurality of pickup images is decoded, the processing burden on the tablet terminal 2 is reduced, compared with the case where all the plurality of pickup images is decoded.

Modifications

The invention is not limited to the above embodiment and can be modified in various manners. Hereinafter, some modifications will be described. Of the modifications below, two or more may be combined.

(1) Modification 1

The method in which the projector 1 shows information indicating the timing when the first QR code of a plurality of QR codes is projected, is not limited to the projection of a white image. The projector 1 may project a different image from a white image to show the timing when the first QR code is projected. In another example, the projector 1 may display a predetermined character or graphic pattern near the QR code of the first frame to show the timing when the first QR code is projected. In still another example, the projector 1 may project the QR code of the first frame for a longer time than the QR codes of the other frames to show the timing when the first QR code is projected. In still another example, the projector 1 may output a sound indicating the timing when the first QR code of a plurality of QR codes is projected (hereinafter referred to as "start sound") from the speaker 110. In this case, in Step SB2, the tablet terminal 2 determines that images of all the plurality of QR codes are picked up, when the start sound is detected twice or more via the microphone 207.

(2) Modification 2

The projector 1 may display an image showing the order of divided data (hereinafter referred to as "order image") beside at least one QR code of a plurality of QR codes, in a projected image. For example, when sequentially projecting a plurality of QR codes, the projector 1 may display an order image near each QR code. In this case, the tablet terminal 2 may extract the order image from a pickup image, carry out pattern matching to specify the order indicated by the order image, and determine whether images of all the plurality of QR codes are picked up or not, according to the specified order. Also, in this case, frame numbers need not be included in the QR codes, and the tablet terminal 2 may combine the divided data according to the order indicated by the order image.

Figure 10:
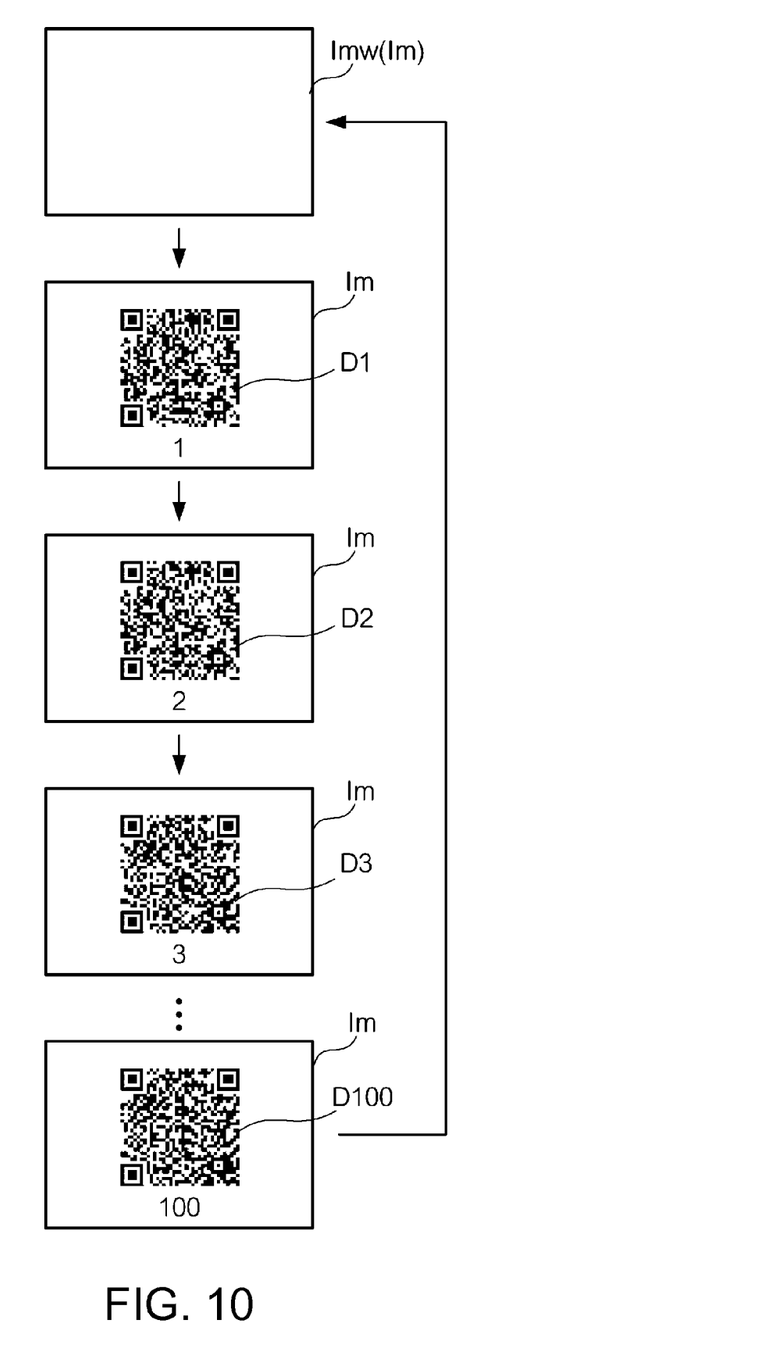
FIG. 10 illustrates transition of a projected image in Modification 2.

FIG. 10 illustrates transition of a projected image Im in Modification 2. In the example of FIG. 10, the order images are numbers indicating the order of the divided data. In FIG. 10, numbers 1, 2, 3, and 100 are displayed as the order of the divided data represented by each QR code D, below QR codes D1, D2, D3, and D100.

(3) Modification 3

The relation between the frame rate F1 and the frame rate F2 is not limited to the relation described in the embodiment. The frame rate F2 may be equal to or below the frame rate F1. In this case, the tablet terminal 2 continues picking up images of the projection surface until it is determined that images of all the plurality of QR codes are picked up, for example, using the method described in the above Modification 2. The specific values of the frame rate F1 and the frame rate F2 are not limited to those described in the embodiment, either.

(4) Modification 4

The processing in which the tablet terminal 2 picks up images of QR codes is not limited to the processing shown in FIG. 8. For example, the tablet terminal 2 may decode a plurality of QR codes whose images are picked up, and determine whether images of all the plurality of QR codes are picked up or not. In this case, the tablet terminal 2 determines whether images of all the plurality of QR codes are picked up or not, according to the total number of frames and the frame number of each QR code.

(5) Modification 5

The processing in which the tablet terminal 2 decodes a plurality of QR codes is not limited to the case where this processing is started, triggered by the end of the processing of picking up images of the QR codes. The processing in which the tablet terminal 2 decodes QR codes may be carried out in parallel with the processing of picking up images of the QR codes.

(6) Modification 6

The processing in which the tablet terminal 2 decodes QR codes is not limited to the processing shown in FIG. 9. For example, the tablet terminal 2 may regard all the plurality of QR codes as decoding targets. In another example, the processing of combining divided data (Step SC6) may be carried out after the decoding of all the QR codes is finished.

(7) Modification 7

The data format of QR codes is not limited to the format shown in FIG. 6. For example, only the QR code that is projected first, of a plurality of QR codes, may have an area indicating the total number of frames. In another example, the QR code that is projected first, of a plurality of QR codes, may not have an area representing divided data.

(8) Modification 8

The frame rate F1 may not be included in QR codes. For example, if the frame rate F1 and the frame rate F2 are predetermined values, the projector may not include information indicating the frame rate F1 in QR codes. Also, the projector 1 may transmit information indicating the frame rate F1 to the tablet terminal 2, not via QR codes. For example, the projector 1 may display a character or graphic pattern indicating the frame rate F1 near at least one QR code of a plurality of QR codes. In this case, the tablet terminal 2 carries out pattern matching with respect to the pickup image and thus specifies the frame rate F1.

(9) Modification 9

The QR codes used in the projection system PS may be of lower versions than version 40. For example, if the tablet terminal 2 cannot read QR codes of version 40, the projector 1 may project QR codes of a lower version than version 40. Also, the code image is not limited to a QR code. The code image may be other two-dimensional codes, for example, PDF 417, CP (communication platform) code, HCCB (high capacity color barcode) or the like, as long as these are images representing encoded information. The code image may also be a one-dimensional code.

(10) Modification 10

The number of QR codes included in a projected image is not limited to one. In a projected image, a plurality of QR codes may be displayed next to each other. The tablet terminal 2 may simultaneously read the plurality of QR codes displayed next to each other. In this case, data can be communicated in a shorter time than in the case where the number of QR codes included in a projected image is one.

(11) Modification 11

The plurality of QR codes that is sequentially projected may be provided with a function that enables the device on the reading side to restore the information of a frame even if the QR code of the frame cannot be read because of camera shake or an obstacle (the case where a person passes in front of the QR code during image pickup, or the like). For example, the plurality of QR codes that is sequentially projected may include a QR code that represents information to enable restoration of the information of a frame that cannot be read.

(12) Modification 12

The plurality of QR codes may not be projected entirely continuously. For example, a projected image that does not include a QR code may be projected every time a predetermined number of QR codes are projected. The projected image that does not include a QR code may also be used, for example, for the tablet terminal 2 to specify the order of the projected QR code. In another example, the projected image that does not include a QR code may be used to synchronize the timing when the plurality of QR codes is projected and the timing when images of the plurality of QR codes are picked up.

(13) Modification 13

The code image is not limited to a QR code. The code image may be other two-dimensional codes, for example, PDF 417, CP (communication platform) code, HCCB (high capacity color barcode) or the like, as long as these are images representing encoded information. The code image may also be a one-dimensional code.

(14) Modification 14

The target data is not limited to dynamic image data. The target data may be, for example, data representing a character, graphic pattern, musical sound, or image. If the target data is data representing a musical sound, the tablet terminal 2 may reproduce the musical sound from a speaker, not shown, in Step SC14.

(15) Modification 15

The target data is not limited to data stored in the projector 1. For example, the target data may be data inputted to the projector 1 from an electronic device such as a personal computer.

(16) Modification 16

The projector 1 may not repeat the projection of a white image and the projection of a QR code. In this case, the projector 1 may output information indicating that the last QR code of a plurality of QR codes is projected (for example, a predetermined image or sound, or the like) after Step SA5.

(17) Modification 17

The display device is not limited to the projector 1. The display device may be any electronic device that can sequentially display a plurality of QR codes, for example, a television set, personal computer, smartphone, mobile phone, digital camera, car navigation system, POS terminal, vending machine, printer, game machine, or the like. The image pickup device is not limited to the tablet terminal 2, either. The image pickup device may be any electronic device that can sequentially picks up images of a plurality of QR codes, for example, a personal computer, smartphone, mobile phone, digital camera, game machine, or the like. For example, a plurality of QR codes may be displayed on a display for electronic advertisement or a display on a vending machine, so that data of a standby screen or ringtone for smartphone can be communicated.

(18) Modification 18

The hardware configurations of the projector 1 and the tablet terminal 2 are not limited to the configurations shown in FIGS. 3 and 4. Each device may have any hardware configuration that can execute the processing shown in FIGS. 5, 8 and 9. For example, the liquid crystal panel 126 may be a reflection-type liquid crystal panel. Also, an electro-optical element such as an organic EL (electroluminescence) element or digital mirror device (DMD) may be used instead of the liquid crystal panel 126. Moreover, the liquid crystal panel 126 may not be provided for each color component. The projector 1 may has a single liquid crystal panel 126. In this case, images of respective color components may be display time-divisionally.

What is claimed is:

1. A communication system comprising:
a display device; and
an image pickup device, the display device including
- a storage unit which stores data,
- a dividing unit which divides the data,
- an encoding unit which encodes each of the data divided by the dividing unit and order information indicating an order of the data and thus generates a plurality of code images, and
- a display unit which displays the plurality of code images generated by the encoding unit, at a first frame rate according to the order, the first frame rate corresponding to a rate at which the display unit displays the plurality of code images, and the image pickup device including
- an image pickup unit which sequentially picks up images of the plurality of code images displayed by the display unit, at a second frame rate, the second frame rate corresponding to a rate whereby the image pickup unit sequentially picks up the images, wherein the second frame rate is a higher rate than the first frame rate,
- a decoding unit which extracts and decodes the code images from pickup images picked up by the image pickup unit; and
- a combining unit which combines the data decoded by the decoding unit according to the order indicated by the order information.

2. The communication system according to claim 1, wherein the display unit repeatedly displays the plurality of code images, and
the image pickup unit continues image pickup until images of all the plurality of code images are picked up.

3. The communication system according to claim 2, wherein the display unit displays information indicating a timing when a first code image of the plurality of code images is displayed.

4. The communication system according to claim 2, wherein the display device includes a sound emitting unit which emits a sound indicating a timing when a first code image of the plurality of code images is displayed.

5. The communication system according to claim 3, wherein the display unit displays an order image indicating the order beside at least one code image of the plurality of code images,
the image pickup device includes a determination unit which determines whether images of all the plurality of code images are picked up or not, on the basis of the order image extracted from the pickup image, and
the image pickup unit continues image pickup until the determination unit determines that images of all the plurality of code images are picked up.

6. The communication system according to claim 1, wherein if the decoding unit is successful in decoding a certain pickup image, the decoding unit decodes, next to the decoding, a pickup image that is two frames or more after the pickup image.

7. An image pickup device comprising:
- an image pickup unit which sequentially picks up images of a plurality of code images sequentially displayed at a first frame rate, the first frame rate corresponding to a rate at which the display unit displays the plurality of code images, and representing data and order information indicating an order of the data, the sequentially picking up images occurring at a second frame rate that is a higher rate than the first frame rate;
- a decoding unit which extracts and decodes the code images from pickup images picked up by the image pickup unit; and
- a combining unit which combines the data decoded by the decoding unit according to the order indicated by the order information.

8. A communication method comprising:
dividing data;
encoding each of the divided data and order information indicating an order of the data and thus generating a plurality of code images;
displaying the plurality of code images at a first frame rate according to the order, the first frame rate corresponding to a rate at which the display of the plurality of code images occurs;
sequentially picking up images of the plurality of code images that is displayed, at a second frame rate, the second frame rate corresponding to a rate whereby the images are sequentially picked up,
wherein the second frame rate is a higher rate than the first frame rate;
extracting and decoding the code images from pickup images that are picked up; and
combining the decoded data according to the order indicated by the order information.

* * * * *